(12) United States Patent
D'Angelo

(10) Patent No.: US 7,533,760 B1
(45) Date of Patent: May 19, 2009

(54) NOISE REDUCTION TUBES

(76) Inventor: John P. D'Angelo, 30 Sherman Pl., Medford, MA (US) 02155

( * ) Notice: Subject to any disclaimer, the term of this patent is extended or adjusted under 35 U.S.C. 154(b) by 0 days.

(21) Appl. No.: 12/214,057

(22) Filed: Jun. 16, 2008

Related U.S. Application Data

(62) Division of application No. 11/084,400, filed on Mar. 18, 2005, now Pat. No. 7,497,300.

(60) Provisional application No. 60/554,269, filed on Mar. 18, 2004.

(51) Int. Cl.
*F01N 1/16* (2006.01)
*F01K 1/06* (2006.01)

(52) U.S. Cl. .................. 181/241; 181/196; 181/197; 181/215; 181/216; 181/219; 181/226; 181/253; 181/254; 181/271; 415/119; 244/1 N; 244/538

(58) Field of Classification Search .......... 181/196, 181/197, 215, 216, 219, 226, 241, 253, 254, 181/271; 415/119; 244/1 N, 538
See application file for complete search history.

(56) References Cited

U.S. PATENT DOCUMENTS

| 1,591,088 | A | * | 7/1926 | Holmes | 181/251 |
|---|---|---|---|---|---|
| 3,323,305 | A | * | 6/1967 | Klees | 60/469 |
| 3,951,566 | A | * | 4/1976 | Mattei et al. | 415/115 |
| 4,199,295 | A | * | 4/1980 | Raffy et al. | 415/115 |
| 4,255,083 | A | * | 3/1981 | Andre et al. | 415/119 |
| 5,033,581 | A | * | 7/1991 | Feuling | 181/257 |
| 5,979,596 | A | * | 11/1999 | Baker | 181/253 |
| 6,112,514 | A | * | 9/2000 | Burdisso et al. | 60/226.1 |
| 6,234,758 | B1 | * | 5/2001 | Pawelski | 417/26 |
| 6,595,320 | B2 | * | 7/2003 | Hwang et al. | 181/253 |
| 6,633,646 | B1 | * | 10/2003 | Hwang | 381/71.5 |

FOREIGN PATENT DOCUMENTS

WO WO 02059474 A2 * 8/2002

* cited by examiner

*Primary Examiner*—Jeffrey Donels
*Assistant Examiner*—Jeremy Luks

(57) ABSTRACT

The invention uses tubes for the reduction of radiated duct noise. The tubes may be used to attenuate narrow band noise by diverting a portion of the acoustic energy through the tubes back into the duct. Upon reintroducing the diverted flow out of phase with the primary flow, acoustic cancellation is achieved. The frequency at which this occurs is dependent on the difference in the path lengths through the tubes and the separation distance—the distance separating the inlet and outlet of the tube. This invention can be used over varying frequency ranges by using an arrangement of flexible, constant length tubes. The effective frequency range is tailored by varying the separation distance and also allows the varying the angular arrangement of the tubes for more effective attenuation of spinning modes having varying propagation angle.

5 Claims, 17 Drawing Sheets

FIGURE 1. THE PRIOR ART

NOISE REDUCTION TUBES

CROSS-REFERENCE TO RELATED APPLICATIONS

This is a divisional of U.S. patent application Ser. No. 11/084,400 filed Mar. 18, 2005 now U.S. Pat. No. 7,497,300.

BACKGROUND

A noise reduction system is often used to reduce noise energy in a duct or duct-like device due to some noise source. Such a noise source may be due to, but not limited to, the turbofan of an aircraft engine. Over the last several decades, much work has been done to attenuate noise generated by aircraft engines.

There are currently two available alternative technologies for reducing inlet noise in jet engines. One technology simply employs "liners" on the engine compartment which are internal coatings that absorb acoustic energy at the engine inlet. This technology is very limited in that it does not reduce noise over a large frequency range, but is mainly limited to broadband noise. Also, liners become ineffective with time because of changes in material properties due to accumulation of dirt, dust and liquids in the absorptive material. Also, the sound reduction obtained from liners is limited since the amount of reduction is directly proportional to the amount of surface treatment. Thus, if an operator wants to greatly reduce the noise using the liner, the operator must use more liner material over a larger surface area. This adds unwanted weight to the aircraft, which affects the fuel consumption of the aircraft.

Additionally, there are active noise cancellation systems known as compression type acoustic drivers, which are effective at specific frequencies. Unfortunately these devices are heavy and expensive and are not durable; i.e., the poor reliability of the moving parts would have a negative impact when used in commercial engines. Furthermore, the electrical power requirement to drive these compression drivers is much too great.

Fan noise has also been identified as a major technical concern in the development of the future engines. Future engines such as an ultra-high bypass (UHB) engine has great fuel efficiency, but at the cost of a high noise level. The introduction of ultra high bypass ratio engines having shorter inlet ducts relative to the size of the fan lessens the effectiveness of passive acoustic liners because as the frequencies decrease the acoustic wavelength increases.

Previous experiments using circumferential arrays of tubes oriented parallel to the inlet duct axis were successful. Power attenuation of up to 8 dB was achieved with the added benefit of 3 dB broadband power reduction of up to 3200 Hz. Theoretical analyses further showed the capabilities of the use of tubes angled to coincide with the propagation angle of the disturbing wave. One study showed, for a wave at 2150 Hz with a propagation angle of 40° from the duct axis, a fixed circumferential array of rigid Herschel-Quincke tubes arranged to coincide with the propagation resulted in 4.1 dB of power reduction compared to just 2.7 dB using an array of tubes oriented parallel to the duct axis.

Previous embodiments of Herschel-Quincke tube treatments have been used successfully to combat turbofan noise due to an engine running at constant speed. However, these treatments could not account for variations in frequency content and variations of the angle of propagation of the disturbance. U.S. Pat. No. 6,112,514 to Burdisso et al., the contents of which are incorporated in their entirety describes a system with Herschel-Quincke tubes to reduce frequencies at a steady state operation. U.S. patent application Ser. No. 10/343,567 filed Oct. 2, 2001 to Byrne et al, the contents of which are incorporated in its entirety, is an improvement over the Burdisso '514 patent in allowing for more adjustment to dynamic operating conditions. For years it was desired to still further noise from such apparatus as jet engines during transition periods of takeoff or landing when closest to population centers than the Burdisso and Byrne teachings provide. The instant invention addresses the problems of the prior art during acoustic noise pollution generated during transition phases that were not addressed by prior attempts to reduce noise.

SUMMARY OF THE INVENTION

This invention is intended for the reduction of sound propagating through a duct. The invention allows the tuning of the acoustic treatment used to reduce the sound propagation by accounting for changes in the frequency and propagation angle of the troublesome sound waves. The invention reduces unwanted noise propagating in a duct shaped device by attenuation by diverting a portion of the acoustic energy and reintroducing it out of phase up stream. The phase reversal is accomplished due to the difference in the path length between the primary and secondary flow paths (FIG. 1.). This invention uses tubes made instead from a flexible material (such as but not limited to polymer hoses) that allows for varying the separation distance as well as the angular orientation. These embodiments discussed below are applicable to all ducts and most especially to a turbofan aircraft engine having a duct like housing.

Variation in the separation distance, while maintaining a fixed length for the secondary acoustic path through the tubes, allows for the attenuation of noise over varying frequency ranges. The flexible design also allows the angular orientation of the tubes to be changed such that the tubes may be aligned with the propagation angle of a spinning acoustic mode within the duct. Further, the orientation angle of the tubes may be varied as the propagation angle of the spinning mode varies thus maximizing the attenuation of the spinning mode. Separation distance and angular orientation may be also be changed in various combinations allowing the acoustic treatment to be tuned to optimally reduce sound from spinning modes having varying frequency content and angular orientation.

One embodiment of the noise attenuation apparatus for ducts such as turbofan aircraft engines comprises at least one tube having an inlet end and an outlet end, wherein the ends are separated by a distance capable of being varied during operation, wherein the ends are in fluid communication with the duct. A distance actuator for changing the distance between the inlet end and the outlet end of the tube within the duct allows for dynamic tuning of the tubes by repositioning the tube ends in the fixed length flexible tubes.

Another embodiment includes an orientation actuator, wherein the tube has an orientation angle that can be changed by the orientation actuator. This in combination with the adjustment of the tube ends dynamically reduces unwanted noise in ducts.

Another embodiment includes a control system to control the separation distance of the at least one tube. The embodiment may include an outlet tuning ring capable of rotation around the axis of the duct and movement along the length of the duct. The position of the inlet end of the tube may also be fixed relative to the duct. The position of the outlet end of the tube may also be fixed relative to the duct. The distance between the inlet end of the tube and the outlet end of the tube on the duct may both be moved relative to the duct when the distance between the two ends are changed.

In one embodiment an outlet tuning ring can be capable of rotation around the axis of the duct and movement along the length of the duct wherein the inlet end fixed relative to the duct and the outlet end of the tube is affixed to the outlet tuning ring. Another embodiment may include an inlet tuning ring capable of rotation around the axis of the duct and movement along the length of the duct wherein the outlet end of the at least one tube is fixed relative to the duct and the inlet end of the tube is affixed to the inlet tuning ring.

In another embodiment an inlet tuning ring capable of rotation around the axis of the duct and movement along the length of the duct wherein the inlet end of the at least one tube is attached to the inlet tuning ring; and, an outlet tuning ring capable of rotation around the axis of the duct and movement along the length of the duct wherein the outlet end of at least one tube is attached to the inlet tuning ring.

Another embodiment of a noise attenuation apparatus for ducts such as turbofan aircraft engines comprises at least one tube having an inlet end and an outlet end, wherein the ends are separated by a distance capable of being varied during operation, wherein the ends are in fluid communication with the duct. Furthermore, at least one flexible tube branch attached in fluid communication to at least one end of the at least one tube. There are at least three ports wherein the at least three ports comprises an inlet port at the inlet end of the at least one tube having an open position that allows the inlet end of the tube to be in fluid communication with the duct and a closed position to prevent the inlet end to be in fluid communication with the duct. Also included is a branch port that controls fluid communication between the at least one tube and the at least one branch tube. Lastly an outlet port at the outlet end of the at least one tube having an open position that allows the inlet end of the tube to be in fluid communication with the duct and a closed position to prevent the inlet end to be in fluid communication with the duct. The apparatus may include a measurement system capable of sensing the presence of spinning and non-spinning acoustic modes and their respective amplitudes, phase, resonant frequencies and angles of propagation. A control system may be used to control the fluid communication of the at least one tube with the duct. Further options include an outlet tuning ring capable of rotation around the axis of the duct and movement along the length of the duct. The embodiment can include an outlet tuning ring capable of rotation around the axis of the duct and movement along the length of the duct wherein the inlet end fixed relative to the duct and the outlet end of the tube is affixed to the outlet tuning ring.

A method of noise attenuation for ducts such as turbofan aircraft engines comprising the steps of providing at least one tube having an inlet end and an outlet end, wherein the ends are separated by a distance capable of being varied during operation, wherein the ends are in fluid communication with the duct and the tube has a fixed length. The next step is measuring the frequency of the sound waves of the duct. Then actuating with a distance actuator for changing the distance between the inlet end and the outlet end of the tube within the duct to reduce noise. The noise may be reduced further by moving at least one tuning ring capable of rotation around the axis of the duct and movement along the length of the duct wherein the end of the at least one tube is attached to the inlet tuning ring to reduce noise. The method can include providing a turbofan aircraft engine having a duct.

It is therefore an object of the present invention to provide an adjustable noise reduction system to reduce both broadband and tone fan noise components through a range of frequencies.

It is another object of the present invention to provide a noise reduction system that reduces noise at both inlet and outlet ports of a noise generating system, and more specifically turbofan engines at different engine speeds.

The invention is directed to the attenuation of inlet and outlet noise from turbofan engines. The present invention utilizes an array of specially designed fixed length tubes to effectively divide the acoustic energy generated by the engine. One of the energy components propagates within the tubes while the other propagates within the engine compartment. At some time certain, the acoustic energy in the tubes is reintroduced into the engine compartment to cancel the acoustic energy remaining in the engine as it propagates from the fan towards the inlet and outlet openings.

Several arrays of tubes may be used on one duct or duct-like structure. Such an arrangement would thus provide attenuation of several acoustic modes each having different ranges of frequency content and angular orientation. For such an arrangement, each array may have tubes of different lengths, cross-sectional areas and tube material.

BRIEF DESCRIPTION OF THE SEVERAL VIEWS OF THE DRAWING

These and other features, aspects, and advantages of the present invention will become better understood with regard to the following description, appended claims, and accompanying drawings where:

DETAILED DESCRIPTION OF THE INVENTION

Figure 1:
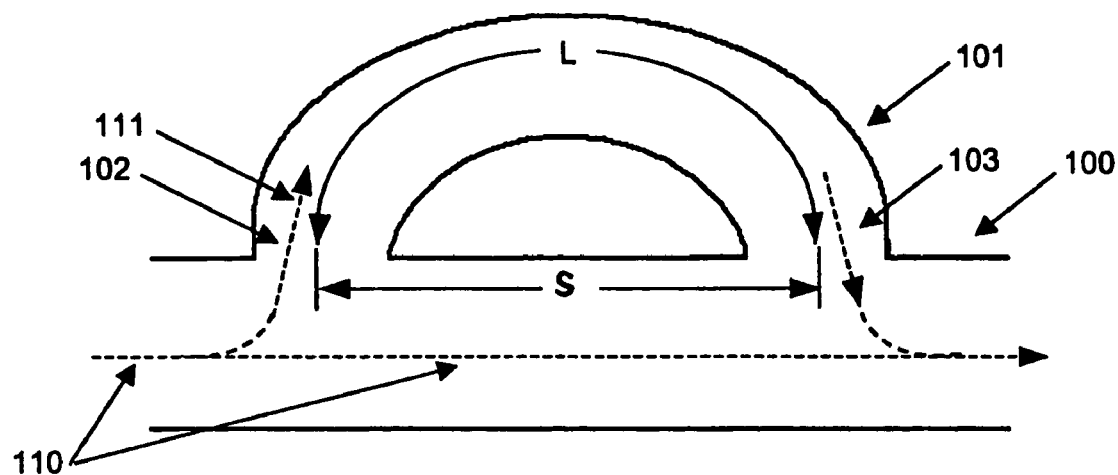
FIG. 1. shows the prior art apparatus for reducing noise.

The present invention is a noise reduction system directed to reducing noise in, duct like structures, especially turbofan engines. The noise reduction system of the present invention reduces noise energy over a wide range of frequencies for both tonal and broadband components of the inlet and outlet noise for turbofan engines. The present invention utilizes at least one fixed length tube assembly comprising at least one dynamically adaptable fixed length tube as described herein, in one embodiment an array of such tubes may be arranged in a circumferential or helical array about the turbofan engine to reduce the noise levels generated. The assembly or assemblies may also be placed at the inlet, and in other locations, such as the upstream or downstream locations from the turbofan engine. The inlet and outlet of the tubes of the assembly can be placed parallel to the engine axis or at an angle. By attaching an array of dynamically adaptable fixed length tubes of appropriate length onto the inlet and/or outlet of the turbofan engine it creates destructive waves that cancel the acoustic energy in the turbofan engine without increasing fuel consumption.

The present invention is used for the reduction of sound existing in or propagating through a duct or duct-like structure. Acoustic modes within long round ducts may be described by their axial and radial wavenumber components. The vector sum of these wavenumber components describes the acoustic wave having wavenumber, $k_{cs}$, traveling at angle $\theta$. This is described in FIG. 3. and mathematically as $$k_z^2 = k_{cs}^2 - k_s^2 \quad \text{equation (1)}$$

where c is the circumferential mode index and s the radial mode index. Note that $k_s = q/a$ where a is the duct radius and q the integer number of wavelengths fitting around the circumference. The pressure distribution is represented graphically for several combinations of circumferential and radial mode indices (q, p) in FIG. 2 where areas of like color are in phase. Acoustic modes having q=0 propagate without spinning since $k_{cs} = k_z$ resulting in a circumferential wavenumber, $k_c = 0$ m$^{-1}$. This is emphasized in equation (2)

$$k_s^2 = k_{cs}^2 - \left(\frac{q}{a}\right)^2 \quad \text{equation (2)}$$

The helix angle or propagation angle, $\theta$, may be determined knowing the wavenumber components as $$\theta = \tan^{-1}\left(\frac{k_z}{k_s}\right) \quad \text{equation (3)}$$

with circumferential wavenumber, $k_s = q/a$ and axial wavenumber $$k_z = \frac{-Mk_0 + \sqrt{k_0^2 - (1-M^2)k_{qp}^2}}{1 - M^2} \quad \text{equation (4)}$$

where M is the flow Mach number. The acoustic wavenumber, $k_0 = \omega/c$ for the duct mode of angular frequency, $\omega$ of phase speed, c has eigenvalues $$k_{qp} = \frac{\chi_{qp}}{a} \quad \text{equation (5)}$$

where $\chi_{qp}$ are the inflection points of the Bessel function of the first kind of order q.

The frequency content of typical turbofan engine noise may be described as broadband with distinct tonal responses at the blade passage frequency (BPF) and harmonics. For subsonic aircraft, these tones are typically 10-20 dB above the broadband response with the BPF response most often the loudest. The BPF and harmonics are generated by the interaction of the turbofan rotor and stator blades. The BPF, in Hertz, may be calculated by $$f_{BPF} = \frac{\Omega N_B}{60} \quad \text{equation (6)}$$

where $\Omega$ is the angular speed of the rotor shaft in revolutions per minute and $N_B$ the number of fan blades. The $n^{th}$ harmonic of the BPF may be determined by $$F_n = n f_{BPF} \quad \text{equation (7)}$$

where n=(1, 2, 3, . . . ).

The solution to the homogeneous wave equation, for waves inside a rigid duct generated by a turbofan, may be expressed as $$p(r, \theta, z, t) = \sum_{q=0}^{Q} \sum_{p=0}^{P} A_{qp} \cos\left(\frac{q\Psi - 2\pi n N_B \Omega t}{60 + \phi_{qp}}\right).$$ equation (8)

$$\left[J_q(k_{qp}r) - \frac{J'_q(k_{qp}a)}{Y'_q(k_{qp}a)} Y_q(k_{qp}r)\right] e^{-ik_{s,qp}z} e^{i2\pi n f_{BPF}t}$$

where t is time, $A_{qp}$ the complex modal amplitude, $k_{z,qp}$ the axial wavenumber for mode (q,p), $J_q(\ )$ the $q^{th}$ order Bessel function of the first kind and $Y_q(\ )$ the $q^{th}$ order Bessel function of the second kind. $J'_q(\ )$ and $Y'_q(\ )$ are, respectively, the derivatives of $J_q(\ )$ and $Y_q(\ )$.

The mode angular velocity may be expressed as $$\Omega_{qp} = 2\pi n N_B \Omega / 60q$$ equation (9)

and for real values of the axial wavenumber, $k_{z,qp}$, the (q,p) mode will propagate down the duct whereas for $k_{z,qp}$ imaginary, the mode decays exponentially.

To understand the innovations represented by using Constant Length, Flexible Herschel-Quincke (HQ) Tubes, it is necessary to understand first the conventional implementation of the fixed length HQ treatment. Current technology requires the HQ tubes to be designed such that they may attenuate a particular resonant frequency, although they have also been reported to attenuate broadband acoustic power by up to 3 dB. Previous research efforts allowed no provision for adjustment of the HQ tube properties. These treatments, then, must be designed to attenuate noise generated for a particular condition. In particular, the design would be for a specified, troublesome tone of a turbofan given a specified engine speed—for instance, at the operating speed during approach.

The required difference in the two path lengths of the HQ tubes may be described as $$\Delta l = (2m+1)\left(\frac{\lambda}{2}\right)$$ equation (10)

where m=0, 1, 2, 3, . . . and $$\lambda = \frac{c}{f}$$ equation (11)

The minimum number of tubes required must be more than four times the highest acoustic circumferential duct mode or $$N \geq 4q+1$$ equation (12)

Since the HQ tube design method presented here assumes the acoustic waves traveling within them are plane waves, the HQ treatment is limited by an upper frequency $$f_{upper} = \frac{c}{2S}$$ equation (13)

where S is the tube cross sectional area.

The dimensions of the components of the acoustic treatment described within the present invention specified herein are for exemplary purposes illustrating the details of one particular configuration. These dimensions may vary depending on the application and are not to be considered limitations of the present invention.

The acoustic treatment of the present invention uses at least one array of constant length, flexible tubes to attenuate the noise within the duct or duct-like structure. Several arrays of flexible tubes may be designed to be used simultaneously such that several acoustic modes, each of varying frequency content and propagation angle, may be attenuated.

In FIG. 1, a single Herschel-Quincke tube is used to demonstrate the prior art. A duct 100 and a single, rigid Herschel-Quincke tube 101 are mounted in parallel. The tube 101 has an inlet 102 and an outlet 103. The primary path of the acoustic mode 110 travels along the duct 100. At the inlet 102 a portion of the acoustic mode diverts into a secondary path 111 into the tube 101 with the remaining acoustic energy 112 traveling through the duct 100. The secondary path 111 is then reintroduced into the duct 100 out of phase with 112 through the outlet 103. The combination of the primary path 110 and the secondary path 111 at the outlet 103 results in the attenuation of the acoustic mode 113.

Figure 2:
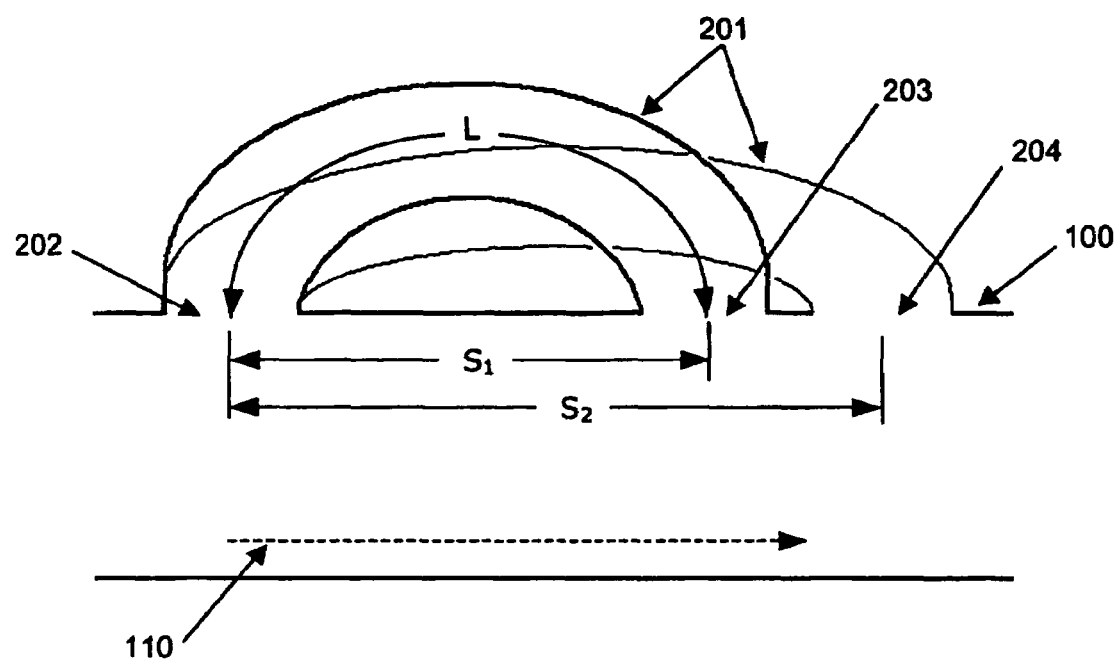
FIG. 2. shows an embodiment of the apparatus with a constant length, flexible tube mounted to a duct. The constant length, flexible tube is shown for two separation distances given a fixed inlet location and a variable outlet location.

The description of the current invention begins in FIG. 2. The duct 100 has a constant length, flexible tube 201 mounted in parallel. In this configuration, the tube 201 has an inlet 202 which is fixed in position and an outlet shown in two different positions 203, 204. The configuration having the outlet at position 203 has a separation distance of $S_1$. The configuration having the outlet at position 204 has a separation distanced of $S_2$. Note that in FIG. 2., S2>S1 and the length of the tube 201 is the same, L, for all separation distances. One embodiment of the noise attenuation apparatus for ducts such as turbofan aircraft engines comprises at least one tube 201 having an inlet end 202 and an outlet end 203, wherein the ends are separated by a distance S1 capable of being varied during operation to a second position S2, wherein the ends are in fluid communication with the duct. A distance actuator 412, 422 for changing the distance between the inlet end 202 and the outlet end 203 of the tube within the duct allows for dynamic tuning of the tubes by repositioning the tube ends in the fixed length flexible tubes.

Figure 3:
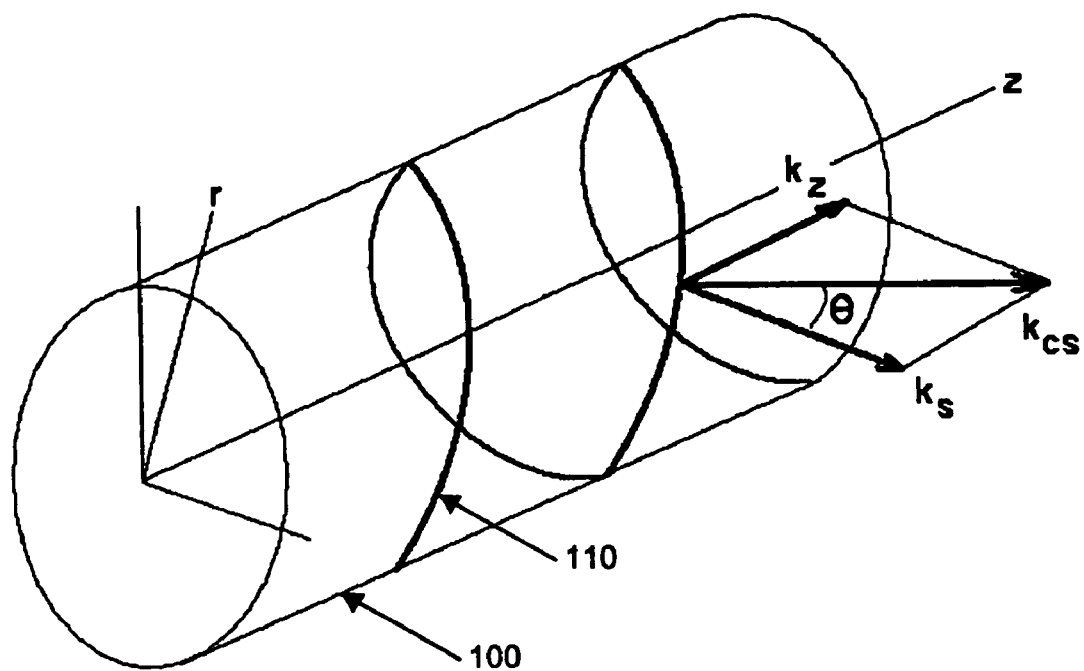
FIG. 3. shows the path of an acoustic wave front of a spinning mode propagation through a round duct. The angle of propagation and the wave number components are defined.

FIG. 3 shows a round duct 100 of radius r and the wave front 110 of a spinning acoustic mode. The wave front 110 propagates with wave number $k_{es}$ and corresponding angle of propagation θ. The axial wavenumber component is $k_z$ and the radial wave number component $k_s$.

Figure 4:
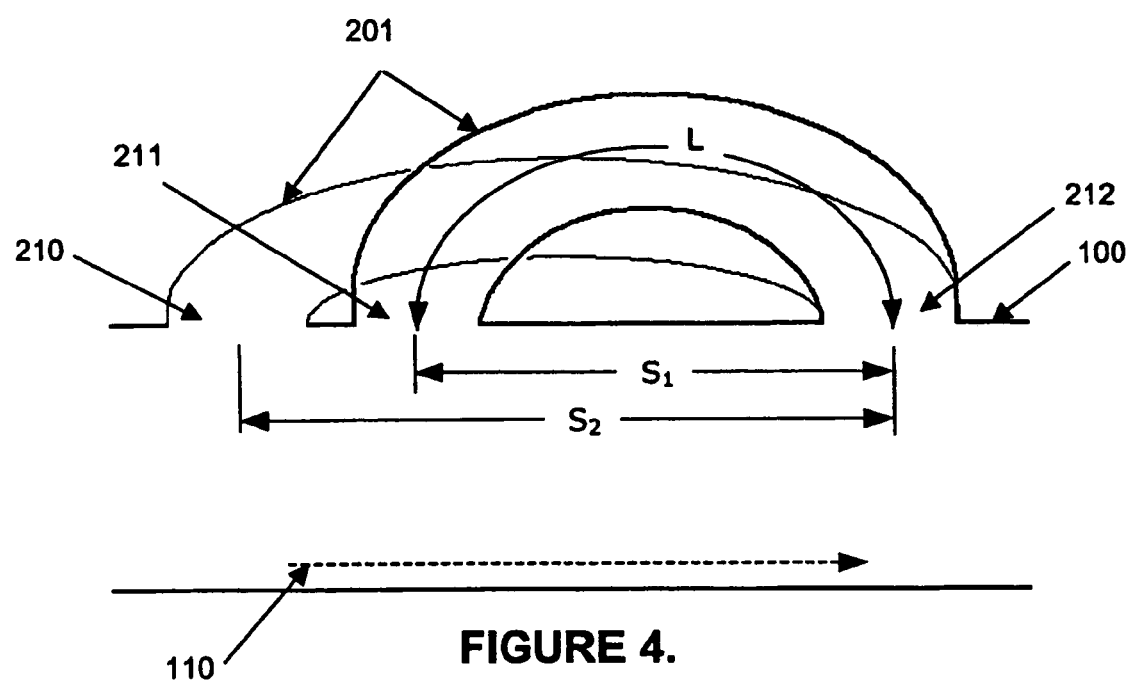
FIG. 4. shows an embodiment of the apparatus with a constant length, flexible tube mounted to a duct. The constant length, flexible tube shows two separation distances given a variable inlet location and a fixed outlet location.

FIG. 4 depicts a different embodiment that has a variable inlet location, shown at two positions 210, 211 and a fixed outlet position 212.

Figure 5:
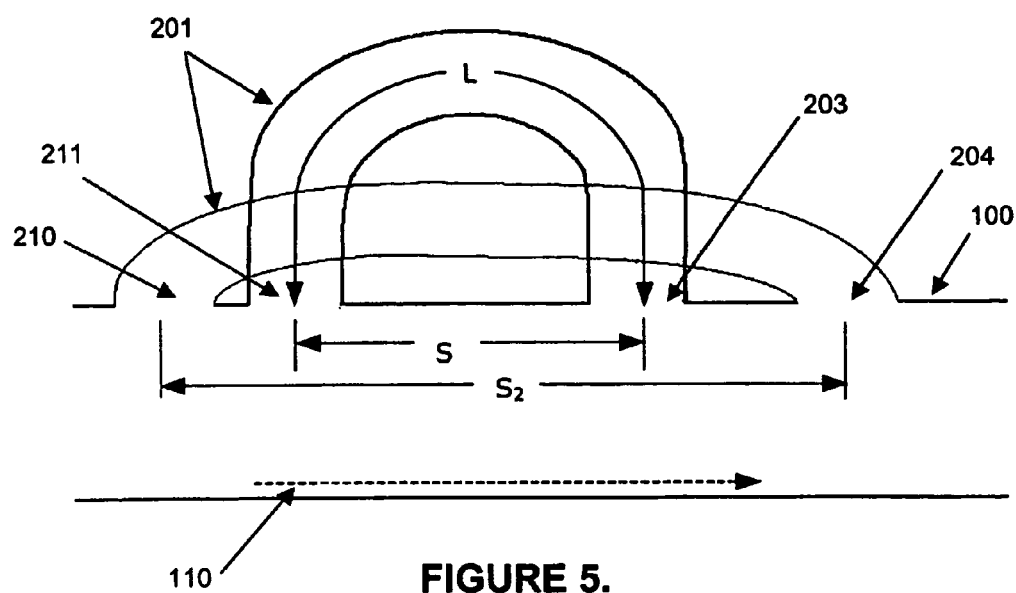
FIG. 5. shows an embodiment with a constant length, flexible tube mounted to a duct. The constant length, flexible tube is shown for two separation distances given both a variable inlet location and a variable outlet location.

FIG. 5 depicts an embodiment that has a variable inlet location, shown at two positions 210, 211 and a variable outlet position 203, 204.

Figure 6:
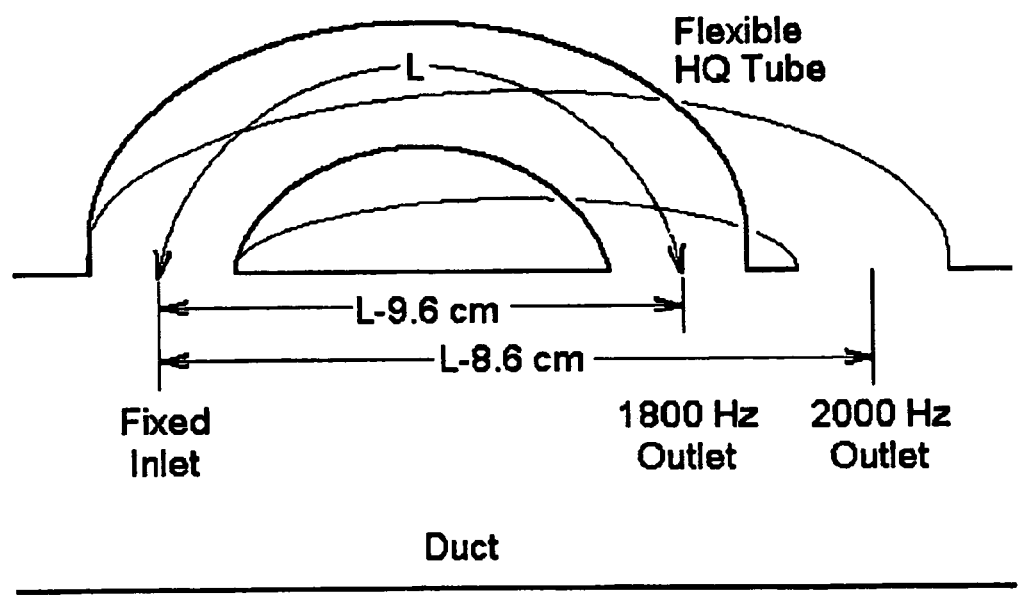
FIG. 6. shows an embodiment using a constant length, flexible tube mounted to a duct for frequency tracking. The constant length, flexible tube is shown for two separation distances such that the tube is tuned to attenuate the variable frequency acoustic mode at two different frequencies. A fixed inlet location and a variable outlet location is shown however the separation distance may be accomplished also using the variable outlet location or the use of both a variable outlet and a variable inlet.

FIG. 6 depicts an embodiment of frequency tracking using a flexible, constant length tube. Assuming the tubes of this present invention are designed to have a path length difference of one-half wavelength (m=0), by equation (10) and equation (11), it is shown that a decrease in frequency requires an increase in separation distance in order for the tube to operate effectively. Note that while the separation distance changes the tube arclength, L, which is the fixed or constant length of the flexible or compliant tube as described for the present invention, remains constant.

As an example, for a tone at 2000 Hz, the wavelength in air at sea level (c=343 m/s) would be 17.2 cm. By equation (10) the resulting minimum path difference, for m=0, would be 8.6 cm. Therefore, the tube of this present invention may be designed having a centerline arclength, L with an inlet/outlet separation distance of L-8.6 cm.

Assuming the engine speed slows resulting in the tone decreasing to 1800 Hz, the new required minimum path difference increases to 9.6 cm from 8.6 cm. The tube is no longer ideally positioned to attenuate the tone. Shortening the inlet/outlet separation distance, by, for example, moving the outlet of the present invention end 1.0 cm closer to the inlet, giving an inlet/outlet separation distance of L-9.6 cm, will tune the tube of this present invention to 1800 Hz allowing continual reduction of the tone as it changes frequency. Note that the inlet/outlet separation distance may be adjusted by moving either the inlet, the outlet (as shown here) or both the inlet and the outlet as the engine changes speed to allow for continuous noise reduction.

Figure 7:
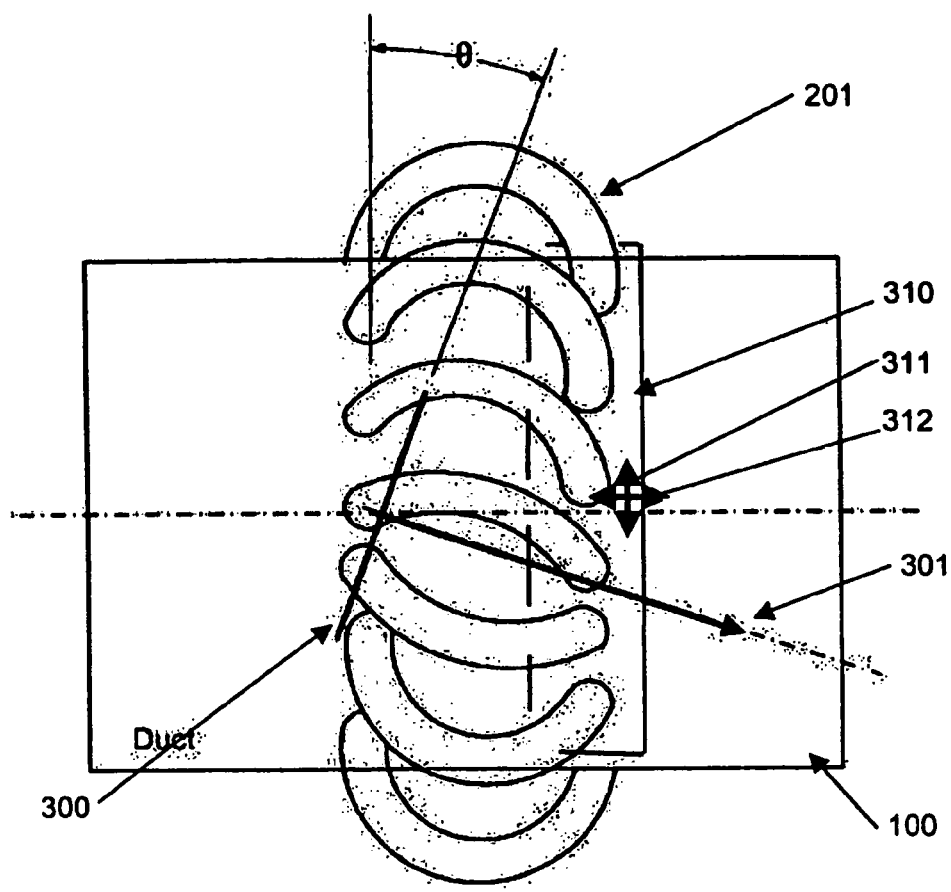
FIG. 7. shows an embodiment with the placement of a circumferential arrangement of constant length, flexible tubes mounted to a duct. This arrangement is shown with the outlet tuning ring used to vary the rotational orientation and separation distance of the tubes by changing the axial and angular position of the outlets.

FIG. 7 depicts the wave front of a spinning mode 300 oriented at a propagation angle θ along the path 301. The use of an outlet tuning ring 310 to which the outlets of an array of tubes 201 are attached is shown and oriented inline with 301. The outlet tuning ring 310 is capable of rotational adjustment 311 of the tube outlets for spin rate tracking and axial adjustment 312 of the tube outlets for frequency tracking. Combinations of the adjustments 311 and 312 may be performed simultaneously such that the array of tubes may be adjusted as the propagation angle and frequency of an acoustic mode changes.

Figure 8:
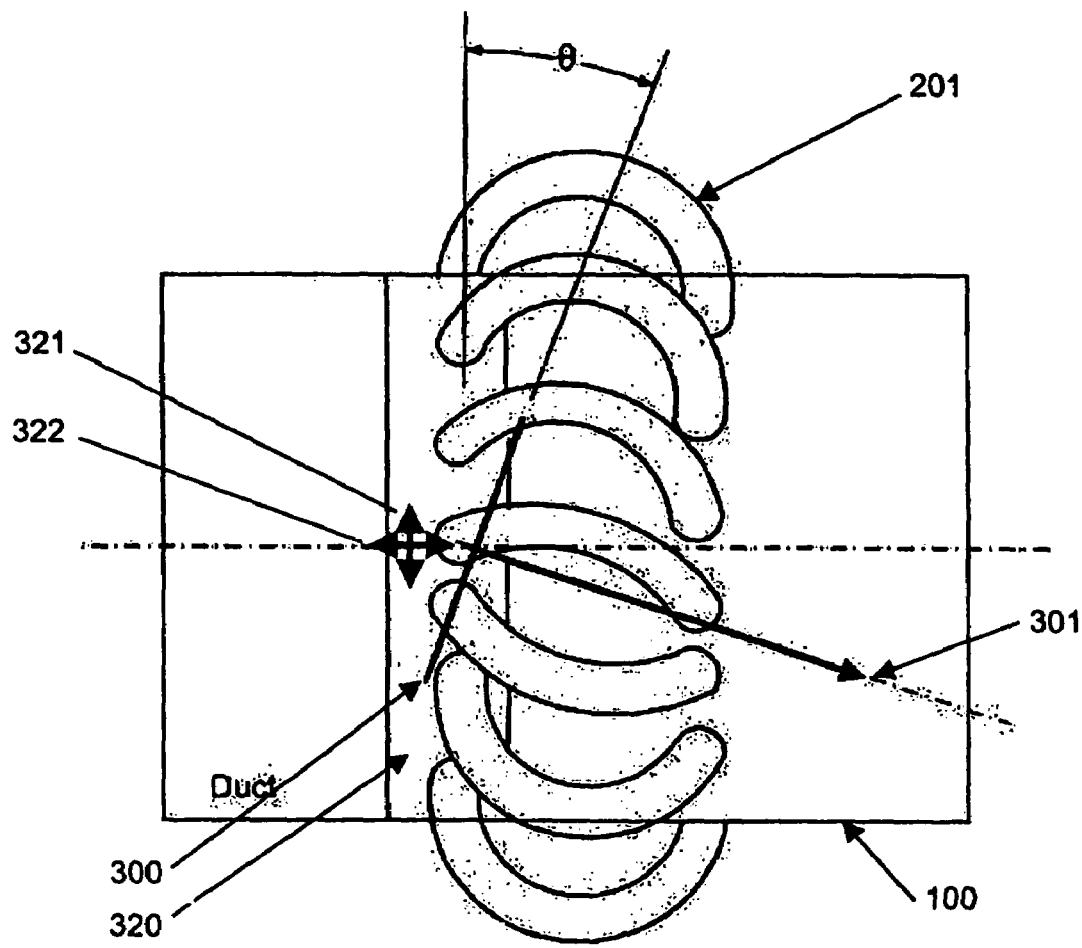
FIG. 8. shows an embodiment with the placement of a circumferential arrangement of constant length, flexible tubes mounted to a duct. This arrangement is shown with the inlet tuning ring used to vary the rotational orientation and separation distance of the tubes by changing the axial and angular position of the inlets.

FIG. 8 depicts an embodiment that has the inlets of the tubes 201 attached to the inlet adjustment ring 320. Rotational adjustment 321 and axial adjustment 322 may be simultaneously adjusted to account for changes in the propagation angle and frequency of an acoustic mode.

Figure 9:
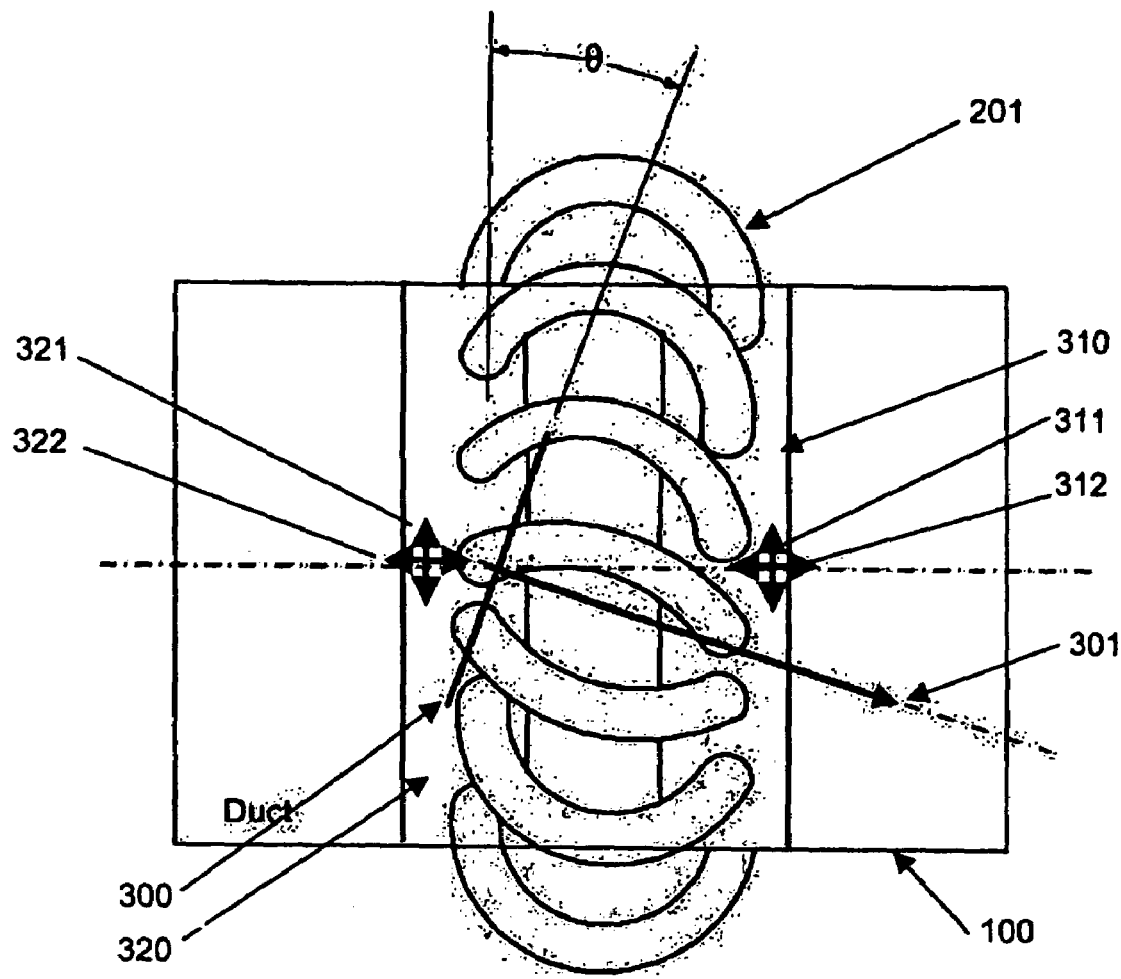
FIG. 9. shows an embodiment with the placement of a circumferential arrangement of constant length, flexible tubes mounted to a duct. This arrangement is shown with both the inlet tuning ring and the outlet tuning ring used to vary the rotational orientation and separation distance of the tubes by changing the axial and angular position of either the outlets, the inlets or both simultaneously.

FIG. 9 depicts an embodiment that uses both the outlet adjustment ring 310 and the inlet adjustment ring 320. The two adjustment rings 310 and 320 may each be adjusted to produce a relative separation distance and a relative orientation angle of each tube 201.

FIGS. 8-9 shows embodiments that include an orientation actuator 311, 312, 321, 322, wherein the tube has an orientation angle that can be changed by the orientation actuator 311, 312, 321, 322. This in combination with the adjustment of the tube ends dynamically reduces unwanted noise in ducts.

Embodiment in FIGS. 7 and 8 include a control system to control the separation distance of the at least one tube. The embodiment may include an outlet tuning ring capable of rotation around the axis of the duct and movement along the length of the duct 311, 312, 321, 322. The position of the inlet end of the tube may also be fixed relative to the duct. The position of the outlet end of the tube may also be fixed relative to the duct. The distance between the inlet end of the tube and the outlet end of the tube on the duct may both be moved relative to the duct when the distance between the two ends are changed.

Figure 10:
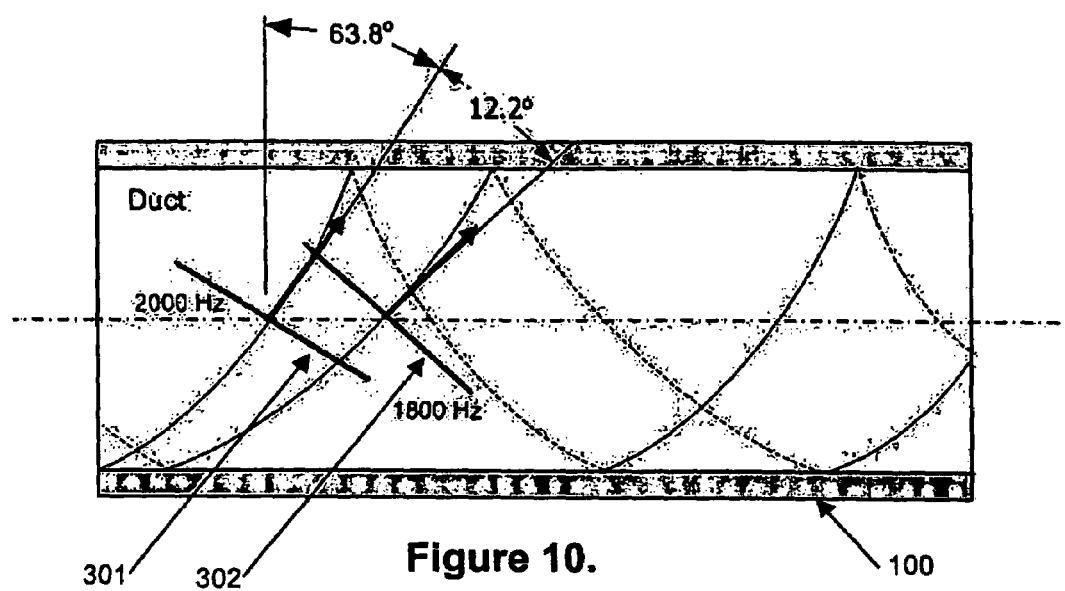
FIG. 10. shows the change in the orientation angle of a spinning mode given a change in the resonant frequency of that spinning acoustic mode.

FIG. 10 depicts frequency and spin rate tracking using a flexible, constant length tube. For demonstration purposes, the acoustic mode is shown given an initial resonant frequency of 2000 Hz. The mode is then slowed to 1800 Hz resulting in a the orientation angle increasing by 12.2° from the original 63.8°.

The helix angle, θ as described in equation (3) and FIG. 3 increases with increasing axial wavenumber, $k_z$. Therefore, as the frequency increases so too does the helix angle. For non-spinning modes, the flexible tubes of this present invention would be arranged parallel to the duct axis and their inlet/outlet separation distance would be tuned to achieve the proper acoustic path delay. For spinning modes, the circumferential array of the tubes of this present invention would each be aligned with the helix angle for best performance. Variations in frequency for a spinning mode will then require modifying both the inlet/outlet separation distance and the tube orientation angle of the tubes of this present invention to be adjusted allowing for continuous attenuation. The orientation angle of the tubes may be adjusted, for example, using the tuning ring depicted in FIG. 7 or using another means of adjustment.

As an example, for a tone at 2000 Hz having a mode order of (2,1) its inflection point would be 3.05. By equation (5), and assuming a duct radius of a=0.2 m, $k_{qp}$=30.5 $m^{-1}$. For demonstration purposes, we let M=0 and by equation (4) the axial wavenumber is $k_z$=20.3 $m^{-1}$. For the circumferential wavenumber of order 2, $k_s$=10 $m^{-1}$. Therefore, by equation (3), the helix angle is 63.8°. The HQ tubes must then be arranged at an angle of 90°−63.8°=26.2° relative to the duct axis as shown in FIG. 5.

Assuming now, the tone decreases from 2000 Hz to 1800 Hz, the axial wavenumber now decreases to 12.6 $m^{-1}$. The resulting helix angle then changes to 51.6° requiring the angle of the flexible HQ tubes of this present invention to change to 38.4° relative to the duct axis—a difference of 12.2°. This is illustrated in FIG. 6.

In addition, the inlet/outlet separation distance must also change as noted previously in section 1.2. Both the separation distance and the angle of the tubes of this present invention may be continually tuned as the disturbance changes to allow for continuous maximum attenuation.

Figure 11:
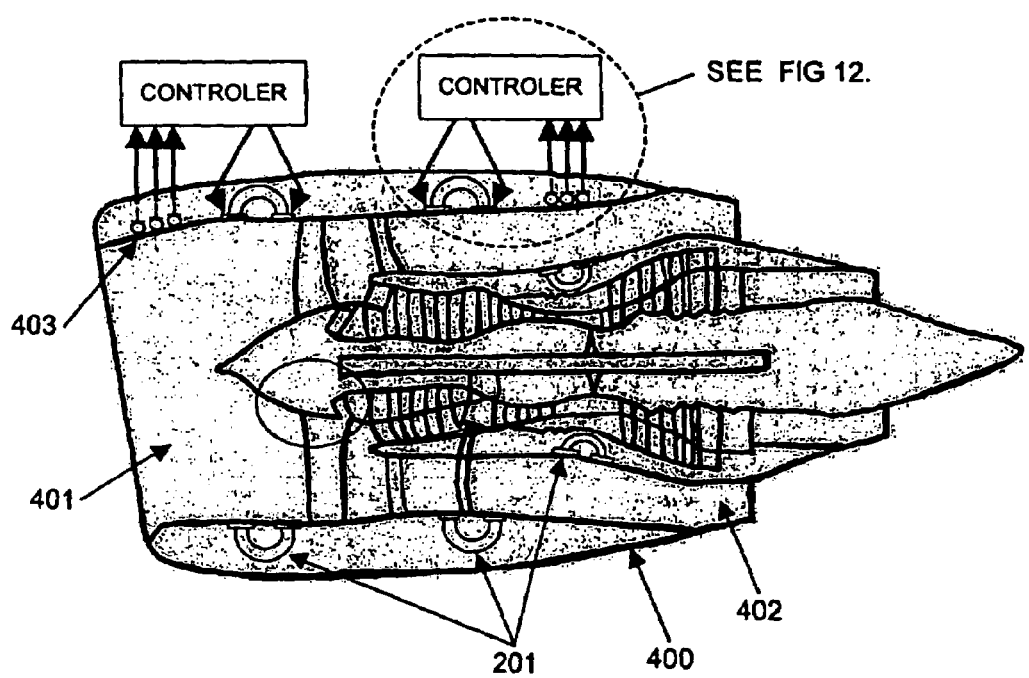
FIG. 11. shows the placement of several constant length, flexible tubes with inlet and outlet tuning rings mounted on a turbofan aircraft engine.

FIG. 11 depicts the placement of several constant length, flexible tubes 201 with inlet and outlet tuning rings mounted in a turbofan engine 400. Arrays of constant length, flexible tubes 201 are shown at the fan inlet 401 and the fan outlet 402. This embodiment uses microphones 403 to measure acoustic pressure which is used as the error signals for the controller, however other error signals, such as but not limited to acoustic intensity, may be used to determine the optimal separation distance and angular orientation of each array of constant length, flexible tubes 201.

Figure 12:
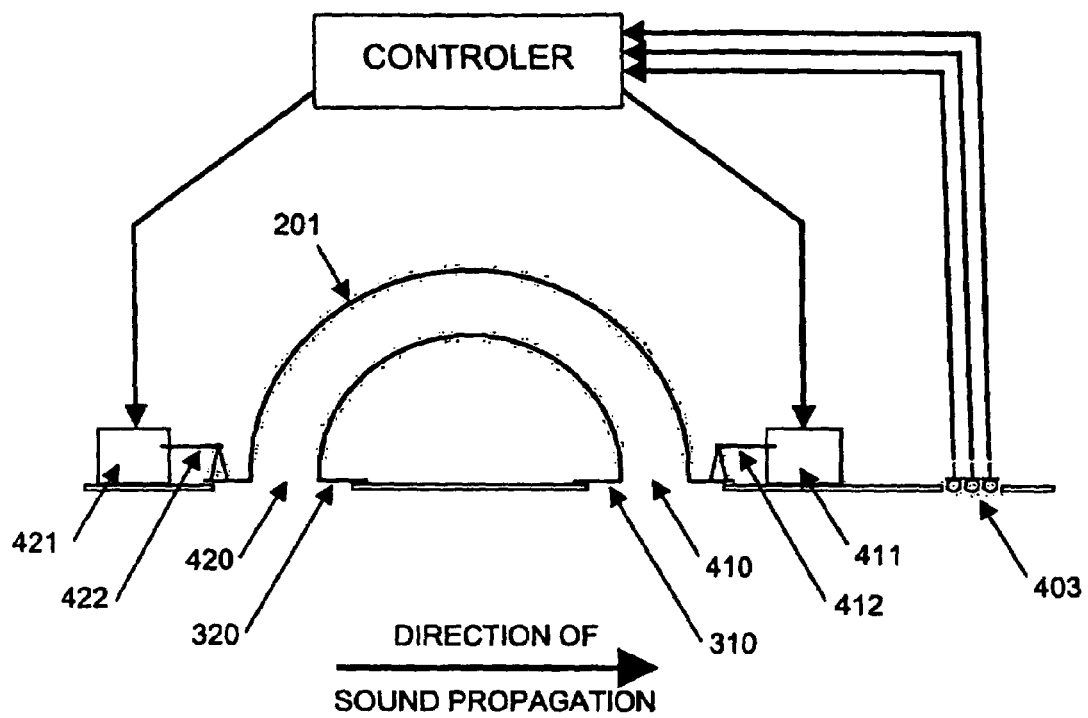
FIG. 12 is a detail view of one flexible tube emphasizing the use and placement of the inlet and outlet tuning rings and the mechanism by which the linear and angular orientations of the inlet and outlet tuning rings may be varied.

FIG. 12 depicts a detailed view of one constant length, flexible tube 201 having an outlet tuning ring 310 and an inlet tuning ring 320 mounted in a turbofan engine as identified in FIG. 11. The outlet tuning ring 310 is used to vary the linear and angular orientation of the tube outlet 410. The inlet tuning ring 320 is used to vary the linear and angular orientation of the tube inlet 420.

A control system is envisioned for the tuning of the separation distance and angular orientation of an array of constant length, flexible tubes 201. A feed-back or feed-forward control system is used for the tuning of the separation distance and angular orientation of an array of flexible, constant length tubes 201. Such a control system would comprise an error measurement, most likely but not limited to the use of several microphones 403, a controller for computing the necessary computations, appropriate signal conditioning hardware and devices (411, 421) used for the manipulation of the linear and angular orientations of the outlet tuning ring 310 and the inlet tuning ring 320.

Linear and angular adjustment of the outlet tuning ring 310 is accomplished by sending the appropriate control signal from the controller to the output tuning ring adjustment device 411. The output tuning ring adjustment device 411 actuates an appendage 412 connected to the output tuning ring 310 thereby adjusting the linear and angular locations of the outlets 410 of that respective array.

Linear and angular adjustment of the inlet tuning ring 320 is accomplished by sending the appropriate control signal from the controller to the input tuning ring adjustment device 421. The input tuning ring adjustment device 421 actuates an appendage 422 connected to the input tuning ring 320 thereby adjusting the linear and angular locations of the outlets 410 of that respective array.

Figure 13:
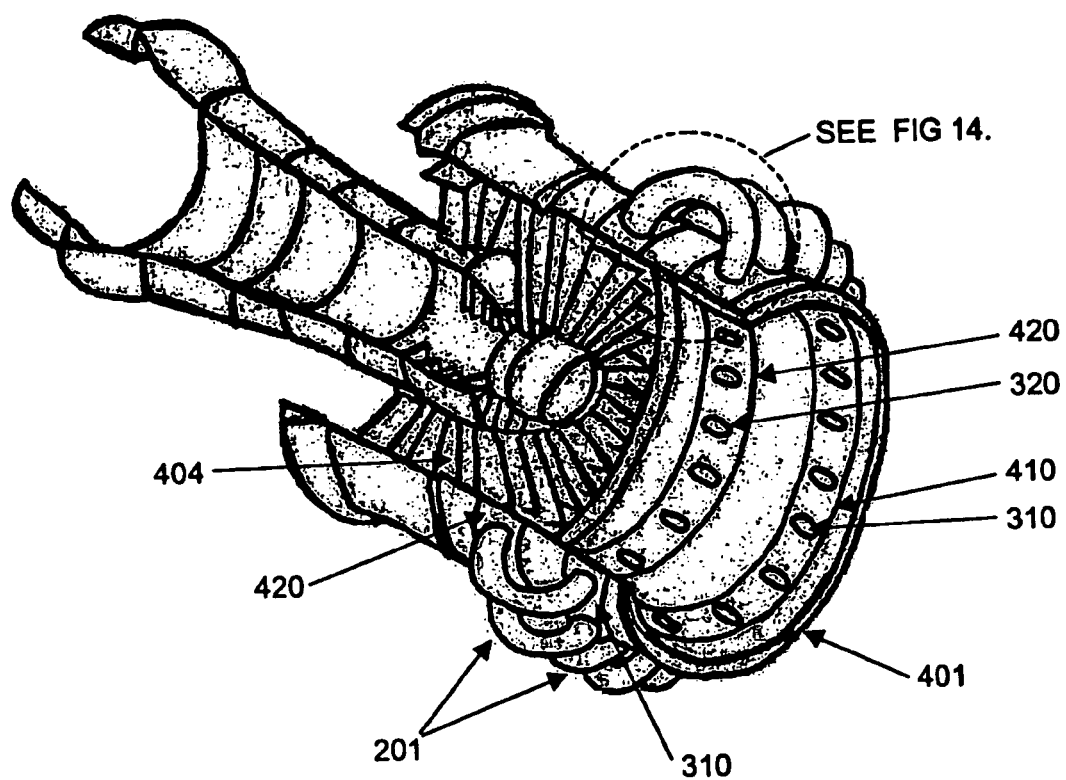
FIG. 13 shows the placement of a single array of constant length, flexible tubes mounted at the inlet of a turbofan engine.

FIG. 13 shows the placement of a single array of constant length, flexible tubes 201 mounted at the inlet 401 of a turbofan engine. The acoustic energy radiating from the fan 404 approaches the inlets 320 of the constant length, flexible tubes 201. This acoustic energy then diverges partly into the tube inlets 320 and into the array of constant length, flexible tubes 201 with the remaining acoustic energy continuing to propagate through the inlet 401 duct of the turbofan engine. The two acoustic paths converge at the outlets 310 of the constant length, flexible tubes 201 thereby minimizing the acoustic energy radiated from the inlet 401 of the operating turbofan engine.

The linear and angular orientations of the inlets 320 are varied by means of the inlet tuning ring 420. The linear and angular orientation of the outlets 310 are varied by means of the outlet tuning ring 410. See FIG. 14 for a detailed view.

Figure 14:
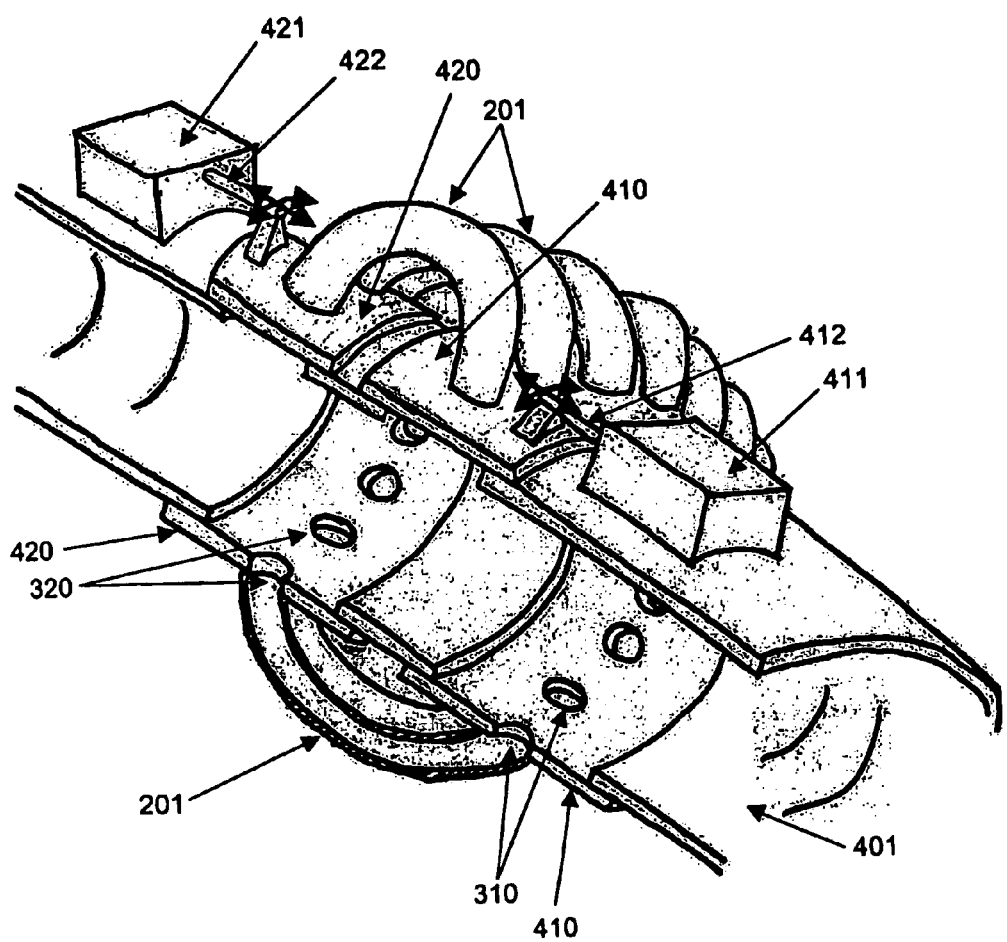
FIG. 14 is a detail view of one flexible tube emphasizing the use and placement of the inlet and outlet tuning rings and the mechanism by which the linear and angular orientations of the inlet and outlet tuning rings may be varied.

FIG. 14 depicts a detailed view of a turbofan engine having one array of constant length, flexible tubes 201 with an outlet tuning ring 410 and an inlet tuning ring 420 as identified in FIG. 13.

The linear and angular orientations of the tube inlets 320 are varied by translating and rotating the inlet tuning ring 420. The orientation of the inlet tuning ring 420 is varied using the inlet tuning ring adjustment device 421 via an appendage 422.

The linear and angular orientations of the outlets 310 are varied by translating and rotating the inlet tuning ring 410. The orientation of the outlet tuning ring 410 is varied using the inlet tuning ring adjustment device 411 via an appendage 412.

Figure 15:
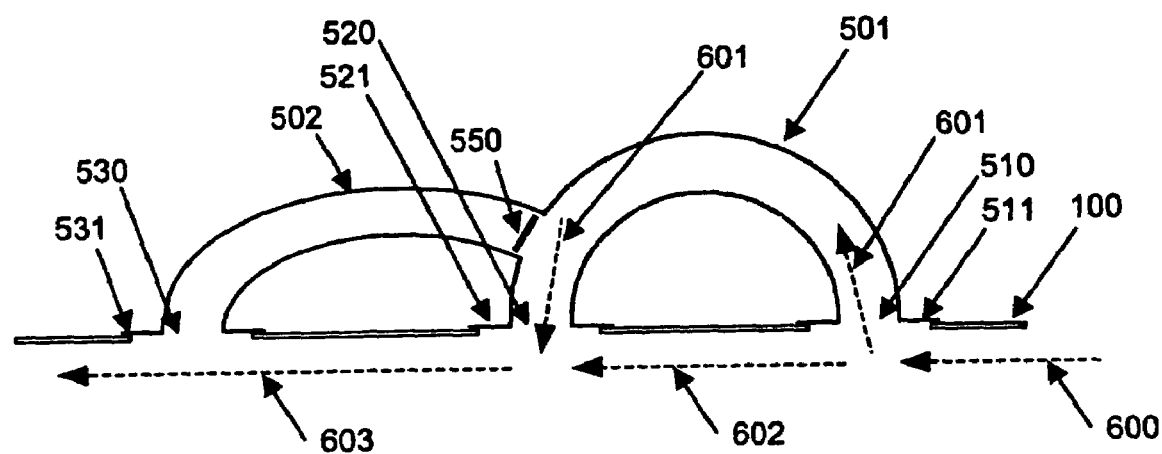
FIG. 15 shows the use of a branched, constant length, flexible tube where the branched portion is closed such that the remaining portion acts as a single constant length, flexible tube.

FIG. 15 shows a duct 100 and the use of a branched, constant length, flexible tube system comprising of a constant length, flexible tube 501 and a constant length, flexible tube branch 502. The tube system comprises of three ports, 510, 520 and 530. The linear and angular orientation of port 510 is varied using tuning ring 511. The linear and angular orientation of port 520 is varied using tuning ring 521. The linear and angular orientation of port 530 is varied using tuning ring 531. An adjustable obstruction 550 prevents acoustic energy from flowing through the tube branch 502.

An acoustic wave 600 propagates through the duct 100 where it partly diverts into the tube 501 with the remaining acoustic energy continuing through the duct 100 as acoustic wave 602. 602 exits the tube 501 at port 520 to combine with acoustic wave 602 in the duct forming acoustic wave 603 having a lower acoustic pressure than acoustic wave 600.

The embodiment of a noise attenuation apparatus for ducts such as turbofan aircraft engines comprises at least one tube having an inlet end and an outlet end, wherein the ends are separated by a distance capable of being varied during operation, wherein the ends are in fluid communication with the duct. Furthermore, at least one flexible tube branch attached in fluid communication to at least one end of the at least one tube. There are at least three ports wherein the at least three ports comprises an inlet port at the inlet end of the at least one tube having an open position that allows the inlet end of the tube to be in fluid communication with the duct and a closed position to prevent the inlet end to be in fluid communication with the duct. Also included is a branch port that controls fluid communication between the at least one tube and the at least one branch tube. Lastly an outlet port at the outlet end of the at least one tube having an open position that allows the inlet end of the tube to be in fluid communication with the duct and a closed position to prevent the inlet end to be in fluid communication with the duct. The apparatus may include a measurement system capable of sensing the presence of spinning and non-spinning acoustic modes and their respective amplitudes, phase, resonant frequencies and angles of propagation. A control system may be used to control the fluid communication of the at least one tube with the duct. Further options include an outlet tuning ring capable of rotation around the axis of the duct and movement along the length of the duct. The embodiment can include an outlet tuning ring capable of rotation around the axis of the duct and movement along the length of the duct wherein the inlet end fixed relative to the duct and the outlet end of the tube is affixed to the outlet tuning ring.

Figure 16:
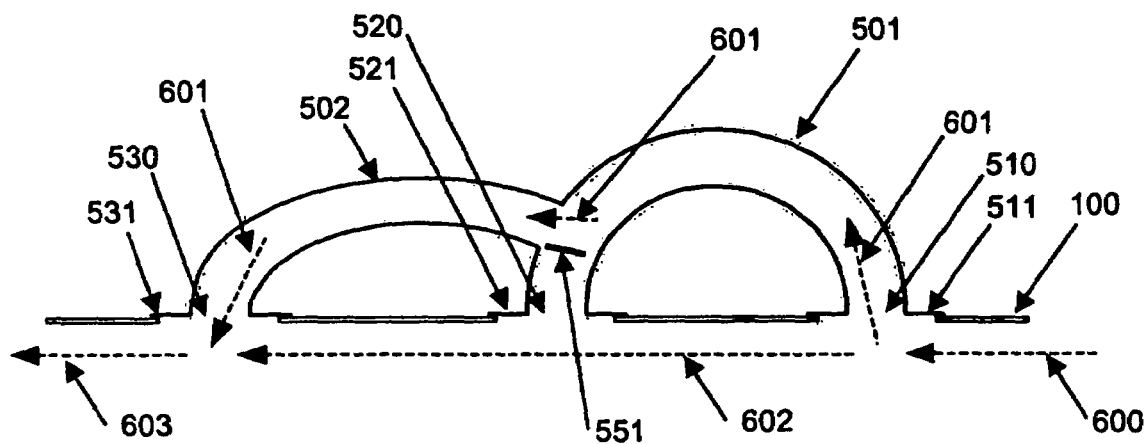
FIG. 16 shows the use of a branched, constant length, flexible tube where the branched portion is open and the remaining portion is closed such that the apparatus acts like a single constant length, flexible tube.

FIG. 16 shows a duct 100 and the use of a branched, constant length, flexible tube system comprising of a constant length, flexible tube 501 and a constant length, flexible tube branch 502. The tube system comprises of three ports, 510, 520 and 530. The linear and angular orientation of port 510 is varied using tuning ring 511. The linear and angular orientation of port 520 is varied using tuning ring 521. The linear and angular orientation of port 530 is varied using tuning ring 531. An adjustable obstruction 551 prevents acoustic energy from flowing through the port 520 thus diverting any flow through tube 501 through tube branch 502.

An acoustic wave 600 propagates through the duct 100 where it partly diverts 601 into the tube 501 with the remaining acoustic energy continuing through the duct 100 as acoustic wave 602. Acoustic wave 601 is prevented from exiting the tube 501 at port 520 by an obstruction 551 and instead is diverted through tube branch 502. Upon exiting tube branch 502 through port 530 acoustic wave 601 combines with acoustic wave 602 forming acoustic wave 603 having a lower acoustic pressure than acoustic wave 600.

Figure 17:
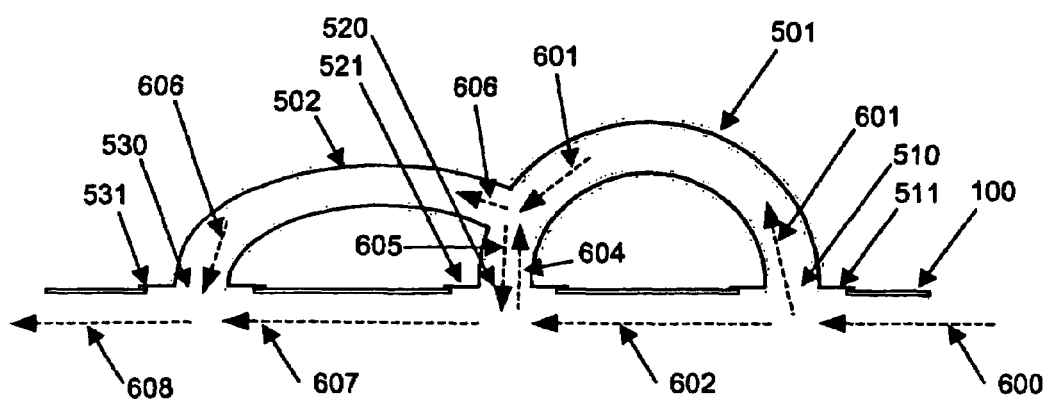
FIG. 17 shows the use of a branched, constant length, flexible tube where all portions are open such that three acoustic paths exist allowing three acoustic modes to be attenuated simultaneously.

FIG. 17 shows a duct 100 and the use of a branched, constant length, flexible tube system comprising of a constant length, flexible tube 501 and a constant length, flexible tube branch 502. The tube system comprises three ports 510, 520 and 530. The linear and angular orientation of port 510 is varied using tuning ring 511. The linear and angular orientation of port 520 is varied using tuning ring 521. The linear and angular orientation of port 530 is varied using tuning ring 531. The adjustable obstructions 550 (FIG. 15) and 551 (FIG. 16) are open allowing acoustic energy to flow through all portions of the HQ tube 501 and the tube branch 502. Such a design allows for one apparatus capable of attenuating three acoustic modes of different frequency content and angle of propagation. The three path length/separation distance combinations are 1) port 510 to port 520, 2) port 520 to port 530 and port 510 to port 530.

An acoustic wave 600 propagates through the duct 100 where it partly diverts as acoustic wave 601 into the tube 501 with the remaining acoustic energy continuing through the duct 100 as acoustic wave 602.

At the junction of the tube and the tube branch acoustic wave 601 diverts partly into acoustic wave 605 exiting through port 520.

Acoustic wave 602 in the duct 100 diverts partly as acoustic wave 604 into the tube through port 520 where it then combines with remaining acoustic energy of 601 less the component of 605 forming then acoustic wave 606 traveling through the tube branch 502.

Acoustic wave 605 exits the HQ tube through port 520 into the duct 100 where it combines with the portion of acoustic wave 602 less acoustic wave 604 thus forming acoustic wave 607 in the duct 100.

Acoustic wave 606 then travels through the tube branch 502 until combining with acoustic wave 607 in the duct 100 forming acoustic wave 608 having a lower acoustic pressure than acoustic wave 600.

The above invention describes a method of noise attenuation for ducts such as turbofan aircraft engines comprising the steps of providing at least one tube having an inlet end and an outlet end, wherein the ends are separated by a distance capable of being varied during operation, wherein the ends are in fluid communication with the duct and the tube has a fixed length. The next step is measuring the frequency of the sound waves of the duct. Then actuating with a distance actuator for changing the distance between the inlet end and the outlet end of the tube within the duct to reduce noise. The method involves the manipulation of the above mentioned parts described throughout the specification based upon the application of the calculations described herein in a computer that actuates controllers to dynamically adjust the position and orientations of the tubes throughout the range of the operation of the duct to minimize unwanted noise.

The noise may be reduced further by moving at least one tuning ring capable of rotation around the axis of the duct and movement along the length of the duct wherein the end of the at least one tube is attached to the inlet tuning ring to reduce noise. The method can include providing a turbofan aircraft engine having a duct.

The invention has been described in terms of the several embodiments. It is to be understood that the preceding description is given to illustrate various embodiments of the present inventive concepts. The specific examples are not to be considered as limiting, except in accordance with the following claims.

I claim:

1. A noise attenuation apparatus for ducts such as turbofan aircraft engines comprising:
   at least one tube having an inlet end and an outlet end, wherein the ends are separated by a distance capable of being varied during operation, wherein the ends are in fluid communication with the duct;
   at least one flexible tube branch attached in fluid communication to at least one end of the at least one tube;
   at least three ports wherein the at least three ports comprise:
      an inlet port at the inlet end of the at least one tube having an open position that allows the inlet end of the tube to be in fluid communication with the duct and a closed position to prevent the inlet end to be in fluid communication with the duct;
      a branch port that controls fluid communication between the at least one tube and the at least one branch tube; and
      an outlet port at the outlet end of the at least one tube having an open position that allows the inlet end of the tube to be in fluid communication with the duct and a closed position to prevent the inlet end to be in fluid communication with the duct.

2. The apparatus of claim 1 further comprising:
   a measurement system capable of sensing the presence of spinning and non-spinning acoustic modes and their respective amplitudes, phase, resonant frequencies and angles of propagation.

3. The apparatus of claim 2 further comprising:
   a control system to control the fluid communication of the at least one tube with the duct.

4. The apparatus of claim 1 further comprising:
   an outlet tuning ring capable of rotation around the axis of the duct and movement along the length of the duct.

5. The apparatus of claim 1 further comprising:
   an outlet tuning ring capable of rotation around the axis of the duct and movement along the length of the duct wherein the inlet end is fixed relative to the duct and the outlet end of the tube is affixed to the outlet tuning ring.

\* \* \* \* \*